United States Patent
Peng et al.

(10) Patent No.: US 8,913,135 B2
(45) Date of Patent: Dec. 16, 2014

(54) METHOD AND APPARATUS FOR MEASURING RESPONSE CURVE OF AN IMAGE SENSOR

(71) Applicant: Spreadtrum Communication (Shanghai) Co. Ltd., Shanghai (CN)

(72) Inventors: Xiaofeng Peng, Shanghai (CN); Yuan Chen, Shanghai (CN); Sen Wang, Shanghai (CN); Fuhuei Lin, Shanghai (CN); Yuchun Huang, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 13/683,276

(22) Filed: Nov. 21, 2012

(65) Prior Publication Data

US 2013/0169825 A1 Jul. 4, 2013

(51) Int. Cl.
*H04N 17/00* (2006.01)
*H04N 17/02* (2006.01)

(52) U.S. Cl.
CPC .................................. *H04N 17/002* (2013.01)
USPC ........... 348/188; 348/187; 348/254; 348/362; 348/222.1; 382/167; 382/263; 358/406

(58) Field of Classification Search
USPC .................................................. 348/180–188
See application file for complete search history.

(56) References Cited

U.S. PATENT DOCUMENTS

| 7,359,572 | B2 * | 4/2008 | Liu et al. | 382/274 |
| 7,626,614 | B1 * | 12/2009 | Marcu | 348/222.1 |
| 8,059,187 | B2 * | 11/2011 | Nakajima | 348/362 |
| 2005/0195298 | A1 * | 9/2005 | Byun et al. | 348/254 |
| 2006/0008141 | A1 * | 1/2006 | Lin et al. | 382/167 |
| 2008/0317372 | A1 * | 12/2008 | Kwon et al. | 382/263 |
| 2009/0080772 | A1 * | 3/2009 | Lin et al. | 382/167 |
| 2012/0098976 | A1 * | 4/2012 | Matsushita et al. | 348/187 |

FOREIGN PATENT DOCUMENTS

CN 201110455922.8 12/2011

* cited by examiner

*Primary Examiner* — Jefferey Harold
*Assistant Examiner* — Humam Satti

(57) ABSTRACT

The present disclosure discloses a method and an apparatus for measuring response curve of an image sensor. The method comprises: taking at least one photograph of a Grey Scale card with an image sensor to be measured, wherein the photograph comprises a plurality of greyscale image blocks; calculating relative exposure values for each greyscale image block respectively corresponding to the greyscale blocks of the Grey Scale card; plotting a plurality of reference points based on pixel values of pixel points within each greyscale image block and the relative exposure values, and executing an interpolation calculation based on the reference points to obtain a response curve of the image sensor.

18 Claims, 4 Drawing Sheets

| RED | GREEN | RED | GREEN |
|---|---|---|---|
| GREEN | BLUE | GREEN | BLUE |
| RED | GREEN | RED | GREEN |
| GREEN | BLUE | GREEN | BLUE |

| RED | EMERALD | RED | EMERALD |
|---|---|---|---|
| GREEN | BLUE | GREEN | BLUE |
| RED | EMERALD | RED | EMERALD |
| GREEN | BLUE | GREEN | BLUE |

| CYAN | YELLOW | CYAN | YELLOW |
| GREEN | MAGENTA | GREEN | MAGENTA |
| CYAN | YELLOW | CYAN | YELLOW |
| GREEN | MAGENTA | GREEN | MAGENTA |

METHOD AND APPARATUS FOR MEASURING RESPONSE CURVE OF AN IMAGE SENSOR

CROSS-REFERENCES TO RELATED APPLICATIONS

This application claims priority to Chinese Patent Application No. 201110455922.8, filed on Dec. 30, 2011 and entitled "METHOD AND APPARATUS FOR MEASURING RESPONSE CURVE OF AN IMAGE SENSOR", which is incorporated herein by reference in its entirety.

BACKGROUND OF THE INVENTION

1. Field of the Invention

The present invention relates to the field of image processing, and more specifically, to a method and an apparatus for measuring response curve of an image sensor.

2. Description of the Related Art

A response curve of a digital image sensor reflects the correspondence between the exposure value when a photograph is taken using the digital image sensor and the pixel value of the image outputted from the image sensor. Generally speaking, the exposure value and the image pixel value exhibit a nonlinear relationship there between. FIG. 1 shows a graph of a response curve of an image sensor. In FIG. 1, the abscissa indicates the exposure value represented by natural logarithm, and the ordinate indicates the pixel value of the image. The pixel value is represented by using 8-bit data, showing 256 values ranging from 0 to 255. By using a response curve of an image sensor, a post processing can be performed on an image captured by the image sensor, so that a complex exposure effect that cannot be realized when the image is taken can be simulated in the post processing. Therefore, the quality of the post processed image can be improved, and further, much more useful information can be extracted from the image.

Different image sensors typically have different response curves. If an inaccurate response curve is used to post process an image, the image obtained through simulation exposure may be distorted and also false image details may be formed. Thus, it is necessary to measure and calculate a response curve individually for each image sensor.

Methods of calculating response curve of an image sensor in the prior art usually make use of a series of images taken with different exposure levels from a same scene. By such methods, the response of pixel values of the image captured by the image sensor to the exposure value is represented as $Z_{ij}=f(E_i*\Delta t_j)$. f is a response curve function. $Z_{ij}$ represents the pixel value at position i of the j-th image, and $E_i$ represents the scene irradiance where i is a spatial index over pixels. $\Delta t_j$ represents the exposure time where j indexes over exposure times $\Delta t_j$. The product of $E_i$ and $\Delta t_j$ represents the exposure value. Although the irradiance at a certain position of an image is kept unchanged, that is, $E_i$ remains the same in the images with different exposure levels, the exposure time $\Delta t_j$ differs, such that the pixel values outputted from a same scene after exposure curve mapping are diverse from each other in the images with different exposure levels. Such methods used for calculating response curve need to select several pixel points from the image. Given that the pixel values $Z_{ij}$ of the pixel points and the corresponding exposure time $\Delta t_j$ are known, a system of equations is formed according to $Z_{ij}=f(E_i*\Delta t_j)$. Then, the response curve f is obtained by solving the system of equations. In some improved methods, the pixel points used in solving the system of equations are screened such that the response curve finally obtained through calculation is smoother and more accurate.

However, these methods require taking photographs from a same scene several times and obtain a series of photographs, and a great number of pixel points of the photographs are needed for the calculation of the response curve. Therefore, the established system of equations for the response curve is large in scale, which results in a great amount of data needed for the calculation and extreme complexity of the solving process.

In addition, taking a series of photographs of a same scene with different exposure durations requires that these photographs should be aligned to the pixel level, such that the correspondence between the pixel values and the exposure values can be accurately reflected. Otherwise, the accuracy of the calculated response curve will be affected. Although some auxiliary devices such as tripod can be used when taking photographs, it is still very difficult to satisfy the above alignment requirement to pixel level. Thus, before calculating the response curve, some special calibration algorithms are needed to perform an alignment calibration on a series of photographs with different exposure levels.

BRIEF SUMMARY OF THE INVENTION

The inventor of the present invention has found that the methods of calculating response curve of an image sensor, according to the prior art, require a great amount of calculations and some special calibration algorithms, and thus proposes a new technical solution that can avoid large scale systems of equations and calibration algorithms.

A purpose of the present disclosure is to provide a method and an apparatus for measuring response curve of an image sensor.

According to a first aspect of the present disclosure, there is provided a method for measuring a response curve of an image sensor, which comprises: taking at least one photograph of a Grey Scale card with an image sensor to be measured, wherein the Grey Scale card has a plurality of greyscale blocks, each greyscale block having a uniform greyscale, different greyscale blocks having different greyscales, and the at least one photograph comprises a plurality of greyscale image blocks respectively corresponding to the greyscale blocks; calculating a relative exposure value for each greyscale image block of the at least one photograph, wherein the relative exposure value is a product of the exposure time with which the corresponding photograph is taken and the greyscale of corresponding greyscale block; plotting a plurality of reference points based on pixel values of pixel points within each greyscale image block and the relative exposure values of the greyscale image blocks, wherein the reference points have the pixel values as the ordinate and the relative exposure values as the abscissa; and executing an interpolation calculation based on the plurality of reference points to obtain a response curve of the image sensor.

In some embodiments of the disclosure, the pixel value of the pixel point within each greyscale image block is an average of the pixel values of partial or all pixel points within each greyscale image block.

In some embodiments of the disclosure, at least two photographs of the Grey Scale card are taken with the same illumination and the same ambient light intensity, and different exposure time.

In some embodiments of the disclosure, the at least one photograph has a plurality of colour components, and a response curve is obtained with respect to each one of the plurality of colour components is obtained.

In some embodiments of the disclosure, the greyscale of the greyscale block is represented by the reflectivity or transmittivity of the greyscale block.

In some embodiments of the disclosure, the colour space of the at least one photograph is a linear colour space.

In some embodiments of the disclosure, the linear colour space is any one of RGB, CYGM, and RGBE colour spaces.

In some embodiments of the disclosure, the colour space of the at least one photograph is a nonlinear colour space, and the method further comprises: converting the colour space of the at least one photograph into a linear colour space.

In some embodiments of the disclosure, the nonlinear colour space is a YUV colour space.

According to a second aspect of the present disclosure, there is provided an apparatus for measuring response curve of an image sensor, which comprises: a shooting unit configured to take at least one photograph of a Grey Scale card with an image sensor to be measured, wherein the Grey Scale card has a plurality of greyscale blocks, each greyscale block having a uniform greyscale, different greyscale blocks having different greyscales, and the at least one photograph comprises a plurality of greyscale image blocks respectively corresponding to the greyscale blocks; a relative exposure value calculating unit configured to calculate a relative exposure value for each greyscale image block of the at least one photograph, wherein the relative exposure value is a product of the exposure time with which the corresponding photograph is taken and the greyscale of corresponding greyscale block; a reference point setting unit configured to plot a plurality of reference points based on the pixel values of pixel points within each greyscale image block and the relative exposure values of the greyscale image blocks, wherein the pixel value is defined as the ordinate data and the relative exposure value is defined as the abscissa data; and an interpolation calculation unit configured to execute an interpolation calculation based on the plurality of reference points, to obtain a response curve of the image sensor.

In some embodiments of the disclosure, the pixel value of the pixel point within each greyscale image block is an average of the pixel values of partial or all pixel points within the each greyscale image block and the apparatus further comprises: a greyscale pixel value calculating unit configured to calculate an average of the pixel values of partial or all pixel points within the each greyscale image blocks.

In some embodiments of the disclosure, the shooting unit is configured to take at least two photographs with the same illumination, the same ambient light intensity, and different exposure times.

In some embodiments of the disclosure, the at least one photograph has a plurality of colour components, and a response curve with respect to each one of the plurality of colour components is obtained.

In some embodiments of the disclosure, the greyscale of the greyscale block is represented by the reflectivity or transmittivity of the greyscale block.

In some embodiments of the disclosure, the colour space of the at least one photograph is a linear colour space.

In some embodiments of the disclosure, wherein the linear colour space is any one of RGB, CYGM, and RGBE colour spaces.

In some embodiments of the disclosure, the colour space of the at least one photograph is a nonlinear colour space, and the apparatus further comprises: a colour space conversion unit configured to convert the colour space of the at least one photograph into a linear colour space.

In some embodiments of the disclosure, the nonlinear colour space is a YUV colour space.

In the embodiments provided by the present disclosure, an image sensor to be measured is used to take at least one photograph of a Grey Scale card, and then multiple reference points are plotted by making use of the pixel values of the pixel points within each greyscale image block and the relative exposure values of the greyscale image block. The uniformity of the pixel values within the greyscale image block makes the selection of pixel points become much easier, and thus it can avoid using calibration algorithms for alignment calibration on the photographs with different exposure levels. The response curve is obtained by executing an interpolation calculation based on the reference points, which avoids solving complex systems of equations and also reduces the amount of calculations. In addition, the relative exposure value of the greyscale image block is calculated by replacing the irradiance with the greyscale of the Grey Scale card, and thus it is unnecessary to utilize an instrument to measure the actual exposure value.

In some embodiments, by using an average of partial or all pixel values within the same greyscale image block of the photograph to substitute the original pixel value of each pixel point, the amount of data used in the interpolation calculation of the response curve is further decreased, and performance with respect to noise sensitivity is also improved.

In some embodiments, at least two photographs of a Grey Scale card are taken with different exposure time, and thus the number of the reference points for calculating the response curve can be increased, thereby obtaining a more accurate response curve calculated based on the reference points.

In some embodiments, for each colour component, reference points are plotted by the relative exposure values and the pixel values of the pixel points in the colour component photograph, and thus a more accurate response curve can be obtained with respect to each colour component of an image sensor can be obtained.

Further features of the present disclosure and advantages thereof will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

The present disclosure can be better understood by reading the following detailed description with reference to the accompanying drawings. In the figures.

DETAILED DESCRIPTION OF THE EMBODIMENTS

Figure 1:
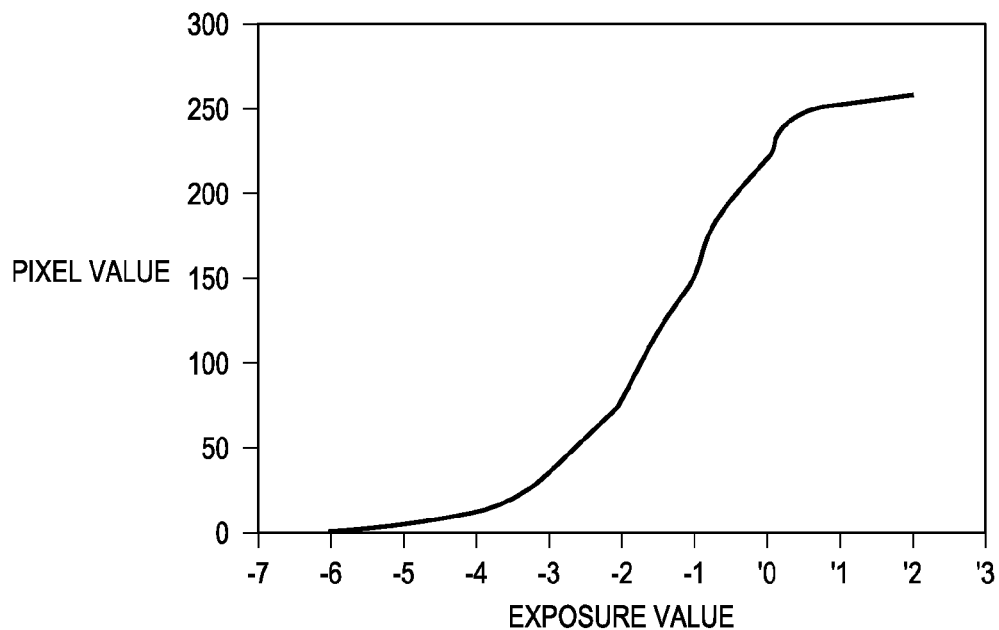
FIG. 1 illustrates a response curve of an image sensor.

Various exemplary embodiments of the present disclosure will now be described in detail with reference to the drawings. It should be noted that the relative arrangement of the components and steps set forth in these embodiments do not limit the scope of the present disclosure unless it is specifically stated otherwise.

Meanwhile, it should be understood that, for the convenience of description, each component in the figures has not been necessarily drawn to scale.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

The solution for calculating response curve of an image sensor provided by the present disclosure obtains photographs of a Grey Scale card by shooting a Grey Scale card. Then, relative exposure values are calculated based on the exposure time and the greyscale of the greyscale image block of the photographs. Thereafter, reference points are plotted by making use of the correspondence between the relative exposure values and the pixel values of the pixel points within the greyscale image block, and thus interpolation calculation can be executed based on the reference points, thereby a complete response curve of the image sensor is obtained.

Method for Measuring Response Curve of an Image Sensor

Figure 2:
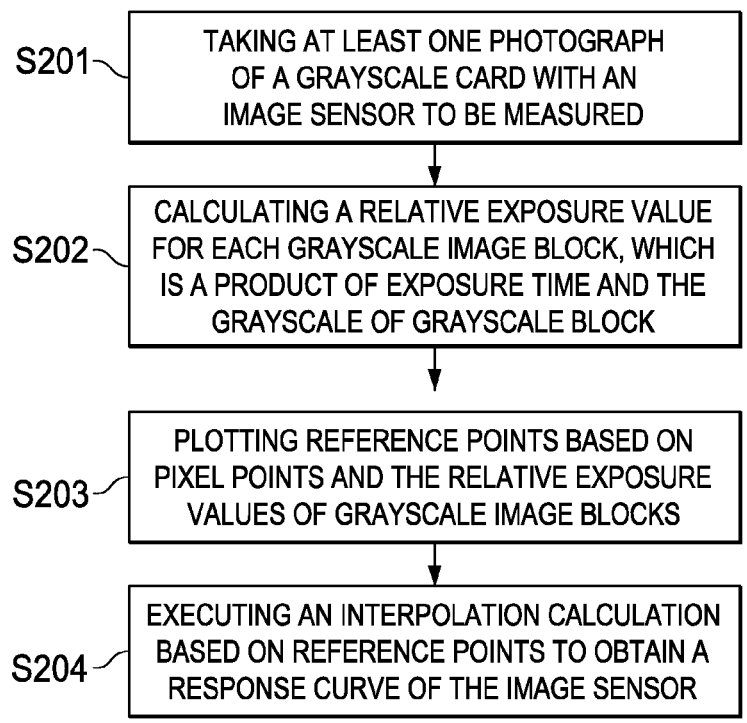
FIG. 2 is a flow chart of the method for measuring response curve of an image sensor according to an exemplary embodiment of the present disclosure.

FIG. 2 is a flow chart of the method for measuring a response curve of an image sensor provided by the embodiments of the present disclosure. The steps of this method embodiment will be described in detail below.

At step 201, at least one photograph of a Grey Scale card is taken with an image sensor to be measured. The Grey Scale card has a plurality of greyscale blocks and each greyscale block has a uniform greyscale. Different greyscale blocks have different greyscales, and the photograph or photographs comprise a plurality of greyscale image blocks respectively corresponding to the greyscale blocks.

The image sensor to be measured is used to take at least one photograph of the Grey Scale card, and thereby at least one captured photograph is obtained. The exposure time of each photograph is represented as $T(j)$ where j indexes over the exposure times and $j=1, \ldots, J, J \geq 1$.

In some embodiments, an image sensor to be measured can be used to take at least two photographs of the Grey Scale card with different exposure times, and thus the number of the reference points for subsequently calculation of the response curve can be increased, thereby obtaining a more accurate response curve. When taking at least two photographs of the Grey Scale card so as to obtain more photographs, the illumination and the ambient light intensity are kept unchanged.

The Grey Scale card used in the above steps can be a reflective Grey Scale card or a transmissive Grey Scale card. The Grey Scale card may be a standard Grey Scale card.

The reflective Grey Scale card is composed of a group of greyscale blocks with gradually changed reflectivity, whose lighting source is placed in the front thereof. The greyscale of the greyscale block is represented by its reflectivity.

The transmissive Grey Scale card is composed of a group of greyscale blocks with gradually changed transmittivity, whose lighting source is placed in the backside thereof. The greyscale of the greyscale block is represented by its transmittivity.

Figure 3:
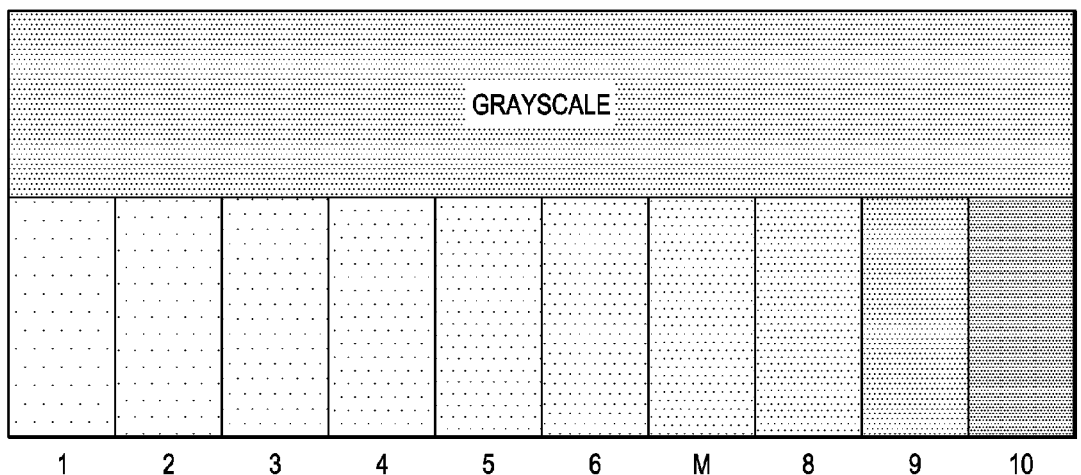
FIG. 3 illustrates an example of a Grey Scale card.

The Grey Scale card has a plurality of greyscale blocks. Each greyscale block has a uniform greyscale, and different greyscale blocks have different greyscales. The reflectivity or transitivity of each greyscale block on a Grey Scale card is generally marked. The following embodiments are described by taking the reflective Grey Scale card as an example. FIG. 3 shows an example of a reflective Grey Scale card with ten greyscale blocks whose reflectivity is respectively represented as $R(i)$, $i=1, 2 \ldots, 10$. The photograph of the Grey Scale card taken with the image sensor to be measured comprises a plurality of greyscale image blocks respectively corresponding to the greyscale blocks.

At step 202, the relative exposure value of each greyscale image block is calculated, and the relative exposure value is a product of the exposure time with which the corresponding photograph is taken and the greyscale of corresponding greyscale block.

The actual exposure value at the time when the photograph is taken can be obtained by calculating a product of the ambient irradiance and the exposure time. However, the value of the ambient irradiance requires measurement with an instrument, and the measurement process is also extremely complex. In the present disclosure, complex measurement process can be avoided by calculating the relative exposure value instead of measuring the absolute value of the ambient irradiance of each pixel point. Therefore, it is easier to obtain the response curve.

The relative irradiance can be represented indirectly by using the greyscale of the greyscale block and the relative exposure value is a product of the exposure time used when the picture is taken and the greyscale of each greyscale block.

Specifically, by taking the reflective Grey Scale card as an example, the greyscale of the greyscale block is represented by its reflectivity $R(i)$. $E(i,j)$ represents the relative exposure value of the i-th greyscale block at the j-th exposure time, the exposure time is indicated as $T(j)$, and the relative exposure value $E(i,j)$ is: $E(i,j)=R(i)*T(j)$.

As described above, at step 201, the number of the captured photographs is J, and each photograph may contain for example ten greyscales. Therefore, there are all together 10*J relative exposure values $E(i,j)$, wherein, $i=1, 2, \ldots, 10, j=1, 2, \ldots, J, J \geq 1$.

When calculating the relative exposure value, the greyscale of the greyscale block can also be represented by using the transmittivity. Accordingly, the relative exposure value of the greyscale image block can be obtained by multiplying the transmittivity with the exposure time.

At step 203, a plurality of reference points are plotted based on the pixel values of pixel points within each greyscale image block and a relative exposure value of that greyscale image block. The reference points plotted take the pixel values as the ordinate and the relative exposure values as the abscissa. Therefore, interpolation calculation can be executed based on the reference points in the subsequent steps, so as to obtain the response curve of the image sensor.

Within the response curve space, for example, the abscissa can represent the relative exposure value of the pixel point of the captured photograph and the ordinate can represent the pixel value of the pixel point of the captured photograph. $P(i,j)$ and $E(i,j)$ are used for representing the pixel value and the relative exposure value of the pixel point of the captured photograph, where i indexes over greyscale image blocks and j indexes over exposure times. The pixel value $P(i,j)$ and the relative exposure value $E(i,j)$ of the pixel point within one greyscale image block constitute a point having coordinates $[E(i,j), P(i,j)]$ within the response curve space, and this point is plotted as a reference point.

Since the Grey Scale card has a plurality of greyscales, a plurality of reference points can be set based on the pixel value of the pixel points within each greyscale image block and the relative exposure values of the greyscale image block, so as to satisfy requirements for the interpolation calculation.

Taking the photograph of the Grey Scale card having ten greyscales described before as an example, the coordinates of the reference points are $[E(i,j), P(i,j)]$, where $i=1, 2, \ldots, 10$, $j=1, 2, \ldots, J$, and the total number of such reference points is $10*J$.

At step 204, interpolation calculation is executed based on the plurality of reference points, and the response curve is obtained. After setting the reference points, interpolation calculation can be performed on these points, and thus a complete response curve can be obtained.

In the above preferred embodiments, the purpose of taking pictures with different exposure times is to obtain more reference points. However, if the number of the greyscale blocks of the Grey Scale card being used is abundant, the number of the captured photographs can be reduced. For example, if the number of the greyscale blocks of the Grey Scale card is so abundant that the reference points obtained from one photograph have already been capable of satisfying the interpolation calculation requirements and sufficiently covering the entire exposure curve, then it may be enough to only take one photograph of the Grey Scale card.

In some embodiments, the pixel value of any pixel point within each greyscale image block can be used to represent the pixel value of this greyscale image block.

In some embodiments, an average of the pixel values of partial or all pixel points within each greyscale image block can be used for representing the pixel value of the greyscale image block. In such embodiments, $P(i,j)$ can be an average pixel value obtained by firstly summing the pixel values of partial or all pixel points within the i-th greyscale image block of the photograph taken at the j-th exposure and then averaging this summed pixel value. Using an average of the pixel values can reduce the amount of data in the subsequent interpolation calculation. Meanwhile, it can improve performance with respect to the noises produced during the shooting process and enhance calculation accuracy.

Figure 4:
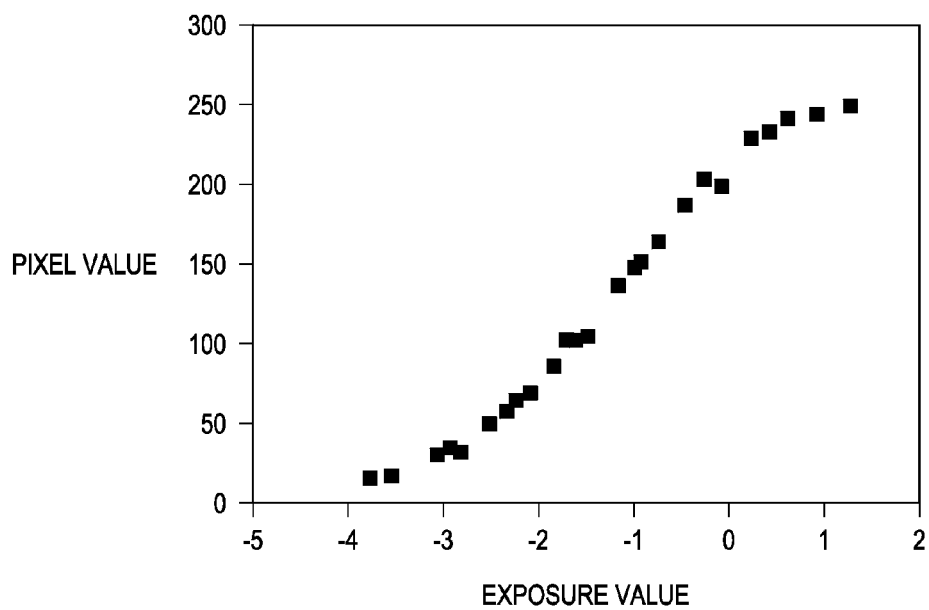
FIG. 4 illustrates a diagram of reference points plotted for the calculation of a response curve of an image sensor according to one example.

The reference points plotted are actually a result obtained by sampling the response curve, as shown in FIG. 4. Further, a complete response curve can be obtained through interpolation calculation. In order to obtain a better result of the interpolation calculation, there are some requirements for the distribution and the number of the reference points. Theoretically, the reference points need to be distributed over the entire response curve. In addition, at a portion where the curve changes rapidly, there needs more reference points than a portion where the curve changes slowly. If the distribution or the number of the reference points fails to satisfy the requirements for completing an accurate interpolation calculation, more photographs can be taken with different exposure times so as to obtain more photographs with different exposure levels, and thus more reference points can be obtained.

When taking photographs of the Grey Scale card, the relative exposure values of different greyscale blocks in the photographs captured with different exposure levels may turn out to be same, such that the multiple reference points plotted overlapping with each other coincide. In this case, the actual number of the reference points is reduced. Thus, more photographs with different exposure levels should be taken, thereby obtaining more reference points.

The method of performing an interpolation calculation so as to calculate a complete response curve of an image sensor is known by one of ordinary skill in the art, and thus it will not be described in detail herein.

The Grey Scale card is theoretically neutral and should not present any colours. The colour components of each pixel point in a photograph are identically equal. For example, the three colour components of red, green, and blue in the RGB image are identically equal. However, since the image sensor may have different responses to different colours, the values of the three colour components of a same pixel point may not be completely equal. Thus, the response curve of the image sensor obtained through the measurement according to the method described in the following embodiments may be more accurate to represent the response curve of each colour component.

Figures 5, 6, 7:
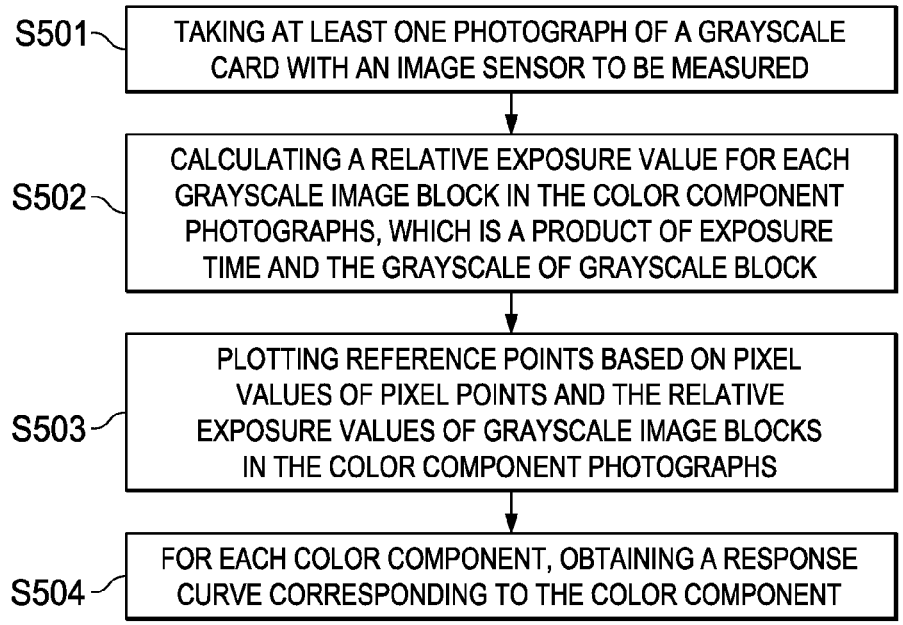
FIG. 5 is a flow chart of the method for measuring response curve of an image sensor according to an exemplary embodiment of the present disclosure.
FIG. 6 illustrates a diagram of the distribution of colour components in Bayer RGB format.
FIG. 7 illustrates a diagram of the distribution of colour components in RGBE format.

FIG. 5 is a flow chart of the method for measuring a response curve of an image sensor provided by the embodiments of the present disclosure. In the embodiments, the photograph obtained has a plurality of colour components, and for each colour component, the response curve corresponding to the colour component is obtained. The steps of one method embodiment will be described in detail below.

At step 501, At least one photograph of a Grey Scale card is taken with an image sensor to be measured, wherein the at least one photograph has a plurality of colour components.

The method of using the image sensor to be measured to take at least one photograph of the Grey Scale card is similar to the aforementioned step 201, and thus details thereof will not be described. The at least one photograph has a plurality of colour components, and methods known by one of ordinary skill in the art can be employed to obtain colour component photographs. For example, down sampling can be performed on the image data of the photograph so as to obtain image data of a same colour component.

Taking Bayer RGB format as an example, each pixel point of the photograph in this format contains one of the three colours of red, green, and blue. The distributions of the three colours are shown in FIG. 6. Down sampling can be performed on the photograph in the Bayer RGB format according to the colour distribution as shown in FIG. 6, thereby obtaining three colour component photographs. The total number of the photographs is $3*J$ and the number of photographs of each of the three colour components is J. The exposure time in the photographs of one of the three colour component photographs is indicated as $T(j), j=1, \ldots, J, J \geq 1$.

At step 502, the relative exposure values of each greyscale image block in the colour component photographs are calculated, and each of the relative exposure values is a product of the exposure time with which the corresponding photograph is taken and the greyscale of corresponding greyscale block.

The method for calculating the relative exposure values is similar to step 202. $E(i,j)$ is used for representing the exposure value of the i-th greyscale block in the photograph taken at the j-th exposure. The exposure time is indicated as T(j), and then E(i,j)=R(i)*T(j).

At step 503, a plurality of reference points are plotted based on the pixel values of pixel points within each greyscale image block and the relative exposure values of the greyscale image block in the colour component photographs. The reference points plotted have the pixel values as the ordinate and the relative exposure values as the abscissa.

The pixel values of the pixel points within each greyscale image block and the relative exposure values of this greyscale image block in the colour components photographs constitute the reference points within response curve space of the colour component. Thus, a plurality of reference points can be plotted based on the pixel values and the relative exposure values corresponding to the pixel values of the pixel points within the plurality of greyscale image blocks. P_RED(i,j), P_GREEN (i,j), and P_BLUE(i,j) respectively represent the pixel values of the pixel points of the i-th greyscale image block in the photographs of the red, green and blue colour components taken at the j-th exposure.

By taking the Grey Scale card having 10 greyscales described before as an example, within the response curve space of red component, [E(i,j), P_RED(i,j)] are plotted as the reference points for the interpolation calculation for the response curve of the red component, where i=1, 2, ..., 10, j=1, 2, ..., J. The total number of such reference points is 10*J. The reference points used in the subsequent interpolation calculation belong to the red component photographs, and thus a complete response curve of red component can be obtained by executing interpolation calculation based on the reference points.

Similarly, within the response curve space of green component, [E(i,j), P_GREEN(i,j)] are plotted as the reference points for the interpolation calculation for the response curve of green component, where the total number of such reference points is 10*J. Within the response curve space of blue component, [E(i,j), P_BLUE(i,j)] are plotted as the reference points for the interpolation calculation for the response curve of blue component, where the total number of such reference points is 10*J.

At step 504, for each colour component, a response curve corresponding to the colour component is obtained.

Interpolation calculation is executed based on the reference points within the response curve of the three colour components respectively, through which a complete response curve of each colour component is obtained.

Figures 8, 9:
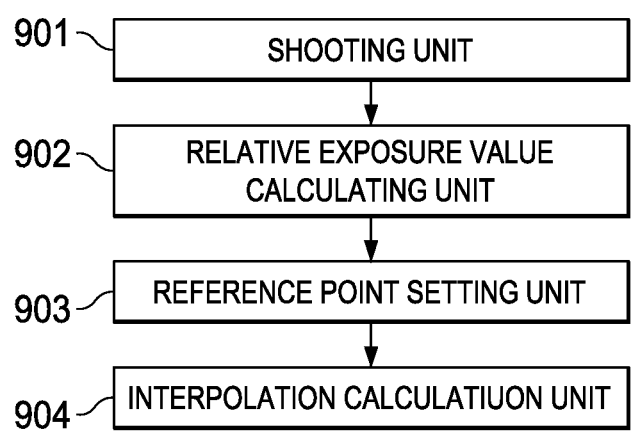
FIG. 8 illustrates a diagram of the distribution of colour components in CYGM format.
FIG. 9 is a block diagram of an apparatus for measuring response curve of an image sensor according to an exemplary embodiment of the present disclosure.

In addition to Bayer RGB format, there are other sensors capable of outputting images in other formats, for example, RGBE format and CYGM format. RGBE uses four colour components of red, green, blue and emerald. The distribution of these colours in RGBE format is shown in FIG. 7. CYGM uses four colour components of cyan, yellow, green and magenta, and the distribution of these colours in CYGM format is shown in FIG. 8. These two colour components spaces both use four colour components. The total number of the colour components photographs is 4*J and the number of photographs of each of these colour components is J. In the subsequent processes, interpolation calculation is executed on based the pixel points within the greyscale image block of the four colours component photographs respectively, and finally four response curves can be obtained.

In addition, it is also possible to perform interpolation calculation only for one or several colour components so as to obtain one or several response curves of the colour components, and then the response curve or curves can be used to represent the response curves of all other colours. Thus, the amount of calculations can be further reduced and the complexity of the calculation can be reduced as well.

The colour space of the photographs outputted from the image sensor to be measured can be a linear colour space, for example, any one of Bayer RGB, RGBE, and CYGM colour spaces.

If the colour space of the photographs outputted from the image sensor is a nonlinear colour space, for example, a YUV colour space, after using the image sensor to be measured to take at least one photograph of the Grey Scale card, the colour space of the photograph or photographs can be firstly converted into a linear colour space, for example, from the YUV colour space into the RGB colour space. Thereafter, subsequent steps are performed as described above. The conversion method is known by one of ordinary skill in the art, and thus the details thereof will not be repeated.

Apparatus for Measuring Response Curve of an Image Sensor

FIG. 9 shows a block diagram of an apparatus for measuring a response curve of an image sensor according to an exemplary embodiment of the present disclosure. The apparatus for measuring a response curve of an image sensor corresponding to the method of the present disclosure is introduced as follows. The apparatus comprises a shooting unit 901, a relative exposure value calculating unit 902, a reference point setting unit 903 and an interpolation calculation unit 904.

The shooting unit 901 is configured to take at least one photograph of a Grey Scale card with an image sensor to be measured. The Grey Scale card has a plurality of greyscale blocks. Each greyscale block has a uniform greyscale, and different greyscale blocks have different greyscales. The at least one photograph comprises a plurality of greyscale image blocks respectively corresponding to the greyscale blocks.

The greyscale of the greyscale block is represented by the reflectivity or transmittivity of the greyscale block.

The relative exposure value calculating unit 902 is configured to calculate the relative exposure values of the greyscale image blocks, and a relative exposure value is a product of the exposure time with which the corresponding photograph is taken and the greyscale of the corresponding greyscale block.

The reference point setting unit 903 is configured to plot a plurality of reference points based on the pixel values of pixel points within each greyscale image block and the relative exposure values of the greyscale image blocks. The pixel value is defined as the ordinate data and the relative exposure value is defined as the abscissa data.

The interpolation calculation unit 904 is configured to execute an interpolation calculation based on the plurality of reference points so as to obtain the response curve.

In some embodiments, the pixel value of the pixel point within each greyscale image block can be an average of the pixel values of partial or all pixel points within each greyscale image block, and thus the apparatus further comprises a greyscale pixel value calculating unit. The greyscale pixel value calculating unit is used for calculating an average of the pixel values of partial or all pixel points within each greyscale image block.

In some embodiments, the shooting unit can be configured to take at least two photographs with the same illumination, the same ambient light intensity and different exposure times.

In some embodiments, the photograph obtained has a plurality of colour components, and for each colour component, the response curve corresponding to the colour component is obtained.

This apparatus also can comprise a colour component separating unit. The colour component separating unit is configured to separate the colour components of the photographs, thereby obtaining colour component photographs. The relative exposure value calculating unit is used to calculate the relative exposure values of the greyscale image block in the colour component photographs. The relative exposure value is a product of the exposure time with which the corresponding photograph is taken and the greyscale of corresponding greyscale block. The reference point setting unit is configured to plot a plurality of reference points based on the pixel values of pixel points within each greyscale image block and the relative exposure values of the greyscale image blocks in the colour component photographs. The interpolation calculation unit executes interpolation calculation based on the plurality of reference points, and for each colour component, response curve corresponding to the colour component is obtained.

The colour space of the photographs can be a linear colour space. The linear colour space can be any one of RGB, CYGM, and RGBE colour spaces.

The colour space of the photographs can be a nonlinear colour space. In this case, the apparatus may further comprise a colour space conversion unit. The colour space conversion unit is used for converting the colour space of the photographs into a linear colour space. The nonlinear colour space can be a YUV colour space.

So far, a method and an apparatus for measuring response curve of an image sensor provided according to the present disclosure have been described above in detail. In order not to obscure the concept of the present disclosure, some details known in the art are not described. One of ordinary skill in the art can absolutely know how to implement the technical solution disclosed therein according to the above description.

The method and apparatus of the present disclosure can be implemented in various manners. For example, the method and apparatus of the present disclosure can be implemented by software, hardware, firmware or any combination of software, hardware, and firmware. The aforementioned sequence of the steps of the method is merely for description, and the present disclosure is not limited to the above particular sequence, unless it is specifically stated otherwise. In addition, in some embodiments, the present disclosure also can be implemented as programs recorded on a non-transitory computer readable medium, and these programs comprise machine readable instructions for realizing the method of the present disclosure. Thus, the present disclosure also covers the recording media for storing the programs of executing the method of the present disclosure.

The above-described apparatuses and methods may be embodied in or performed by various conventional digital data processors or computers, wherein the computers are programmed or store executable programs of sequences of software instructions to perform one or more of the steps of the methods, e.g., steps of the method of FIG. 2, 5, or 9. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 2, 5, or 9, or functions of the apparatuses described herein.

Certain embodiments of the invention further relate to computer storage products with a non-transitory computer-readable medium that have program code thereon for performing various computer-implemented operations that embody the tools or carry out the steps of the methods set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

The embodiments of the present disclosure have been described above with reference to the accompanying drawings. However, it should be understood that, these embodiments are merely illustrative but are not limitations for the claims of the application. The embodiments of the present disclosure can be freely combined without going beyond the scope of the present disclosure and various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described apparatus. Moreover, one of ordinary skill in the art can make various modifications to the embodiments and details of the present disclosure based on the teachings of the present disclosure, without departing from the scope of the present disclosure. Thus, all these modifications are within the spirit and scope defined by the attached claims.

What is claimed is:

1. A method for measuring a response curve of an image sensor, comprising:

taking a single photograph of a Grey Scale card with an image sensor to be measured, wherein said Grey Scale card is a reflective Grey Scale card or a transmissive Grey Scale card, said Grey Scale card has a plurality of greyscale blocks, each grayscale block having a uniform greyscale, different greyscale blocks having different greyscales, a reflectivity or a transitivity of each greyscale block on said Grey Scale card is marked, and said single photograph comprises a plurality of greyscale image blocks respectively corresponding to said greyscale blocks;

calculating a relative exposure value for each greyscale image block of said single photograph, wherein said relative exposure value is a product of an exposure time with which a corresponding photograph is taken and said greyscale of corresponding greyscale block, said greyscale of a greyscale block is represented by its reflectivity or transitivity;

plotting a plurality of reference points based on pixel values of pixel points within each greyscale image block and said relative exposure values of said greyscale image blocks, wherein said reference points have said pixel values as an ordinate and said relative exposure values as an abscissa; and executing an interpolation calculation based on said plurality of reference points to obtain a response curve of said image sensor.

2. The method of claim 1, wherein said pixel value of said pixel point within each greyscale image block is an average of said pixel values of partial or all pixel points within said each greyscale image block.

3. The method of claim 1, wherein said step of taking a single photograph is performed at least two times with a same illumination and a same ambient light intensity, and different exposure times.

4. The method of claim 1, wherein said single photograph has a plurality of colour components, and a response curve with respect to each one of said plurality of colour components is obtained.

5. The method of claim 1, wherein said greyscale of said greyscale block is represented by a reflectivity or transmittivity of said greyscale block.

6. The method of claim 1, wherein said colour space of said single photograph is a linear colour space.

7. The method of claim 6, wherein said linear colour space is any one of RGB, CYGM, or RGBE colour spaces.

8. The method of claim 1, wherein said colour space of said single photograph is a nonlinear colour space, and said method further comprises:
converting said colour space of said single photograph into a linear colour space.

9. The method of claim 8, wherein said nonlinear colour space is a YUV colour space.

10. An apparatus for measuring a response curve of an image sensor, comprising:
a shooting unit configured to take a single photograph of a Grey Scale card with an image sensor to be measured, wherein said Grey Scale card is a reflective Grey Scale card or a transmissive Grey Scale card, said Grey Scale card has a plurality of grayscale blocks, each greyscale block having a uniform greyscale, different greyscale blocks having different greyscales, a reflectivity or a transitivity of each greyscale block on said Grey Scale card is marked, and said single photograph comprises a plurality of greyscale image blocks respectively corresponding to said greyscale blocks;
a relative exposure value calculating unit configured to calculate a relative exposure value for each greyscale image block of said single photograph, wherein said relative exposure value is a product of an exposure time with which a corresponding photograph is taken and said greyscale of corresponding greyscale block, said greyscale of the greyscale block is represented by its reflectivity or transitivity;
a reference point setting unit configured to plot a plurality of reference points based on said pixel values of pixel points within each greyscale image block and said relative exposure values of said greyscale image blocks, wherein said pixel values are defined as an ordinate data and said relative exposure values are defined as an abscissa data; and
an interpolation calculation unit configured to execute an interpolation calculation based on said plurality of reference points, to obtain a response curve of said image sensor, wherein said relative exposure value calculating unit, said reference point setting unit and said interpolation calculation unit are implemented using a processor.

11. The apparatus of claim 10, wherein said pixel value of said pixel point within each greyscale image block is an average of said pixel values of partial or all pixel points within said each greyscale image block and said apparatus further comprises:
a greyscale pixel value calculating unit configured to calculate an average of said pixel values of partial or all pixel points within said each greyscale image blocks.

12. The apparatus of claim 10, wherein said shooting unit is further configured to take at least one more photographs with a same illumination, a same ambient light intensity, and different exposure times.

13. The apparatus of claim 10, wherein said single photograph has a plurality of colour components and said apparatus further comprises: a colour component separating unit configured to separate said colour components to obtain each colour component photographs,
said interpolation calculation unit configured to obtain a response curve corresponding with respect to each one of said plurality of colour components.

14. The apparatus of claim 10, wherein said greyscale of said greyscale block is represented by a reflectivity or transmittivity of said greyscale block.

15. The apparatus of claim 10, wherein said colour space of said single photograph is a linear colour space.

16. The apparatus of claim 15, wherein said linear colour space is any one of RGB, CYGM, or RGBE colour spaces.

17. The apparatus of claim 10, wherein said colour space of said single photograph is a nonlinear colour space and said apparatus further comprises:
a colour space conversion unit configured to convert said colour space of said single photograph into a linear colour space.

18. The apparatus of claim 17, wherein said nonlinear colour space is a YUV colour space.

\* \* \* \* \*